United States Patent [19]

Miller, Jr. et al.

[11] 4,098,408
[45] Jul. 4, 1978

[54] AUTOMATIC INSPECTION SYSTEM FOR NUCLEAR FUEL PELLETS OR RODS

[75] Inventors: William H. Miller, Jr., Oak Ridge; John D. Sease, Knoxville; William R. Hamel, Concord; Ronnie A. Bradley, Oak Ridge, all of Tenn.

[73] Assignee: The United States of America as represented by the United States Department of Energy, Washington, D.C.

[21] Appl. No.: 791,257

[22] Filed: Apr. 22, 1977

Related U.S. Application Data

[63] Continuation-in-part of Ser. No. 734,835, Oct. 22, 1976, abandoned.

[51] Int. Cl.$^2$ .................. B07C 5/08; G01B 13/04
[52] U.S. Cl. ............................... 209/82; 73/37.5
[58] Field of Search .............. 73/37, 37.5, 37.6; 209/72, 75, 71, 82

[56] References Cited

U.S. PATENT DOCUMENTS

| | | | |
|---|---|---|---|
| 2,397,494 | 4/1946 | Kuppersmith | 73/37.5 X |
| 2,402,293 | 6/1946 | Nye | 73/37.6 |
| 2,593,958 | 4/1952 | Aller | 209/82 |
| 3,272,332 | 9/1966 | Jones | 209/72 X |
| 3,485,095 | 12/1969 | Hirata et al. | 73/37.7 X |
| 3,543,562 | 12/1970 | Clemenceau | 73/37.7 |
| 3,595,067 | 7/1971 | Von Der Loe | 73/37.6 |
| 3,608,355 | 9/1971 | Harrison | 73/37 |
| 3,863,493 | 2/1975 | Busenkell | 73/37.5 |
| 3,895,516 | 7/1975 | Swartz | 73/37.6 |

*Primary Examiner*—Daniel M. Yasich
*Attorney, Agent, or Firm*—Dean E. Carlson; Stephen D. Hamel; Louis M. Decklemann

[57] ABSTRACT

An automatic inspection system is provided for determining surface defects on cylindrical objects such as nuclear fuel pellets or rods. The active element of the system is a compound ring having a plurality of pneumatic jet units directed into a central bore. These jet units are connected to provide multiple circuits, each circuit being provided with a pressure sensor. The outputs of the sensors are fed to a comparator circuit whereby a signal is generated when the difference of pressure between pneumatic circuits, caused by a defect, exceeds a pre-set amount. This signal may be used to divert the piece being inspected into a "reject" storage bin or the like.

3 Claims, 12 Drawing Figures

AUTOMATIC INSPECTION SYSTEM FOR NUCLEAR FUEL PELLETS OR RODS

This invention was made in the course of, or under, a contract with the Energy Research and Development Administration.

CROSS-REFERENCE TO RELATED APPLICATION

This application is a continuation-in-part of U.S. Application Serial Number 734,835(70), field Oct. 22, 1976, now abandoned.

BACKGROUND OF THE INVENTION

Fuel elements for several types of nuclear reactors are fabricated using cylindrical pellets or rods containing the nuclear fuel. Typical of these are the pellets or short rods to be utilized in high temperature gas cooled reactors. These typically are about ½ inch in diameter × 3 inch in length and may be prepared using equipment based on the technology described in U.S. Pat. No. 3,763,292. Each pellet or rod must be of uniform diameter and substantially free from surface imperfections to ensure adequate heat transfer to any surrounding cladding during operation.

The fabrication of fuel pellets or rods, particularly using recycle nuclear fuel, will be performed in shielded facilities and thus any inspection device must be remotely operated. One inspection device that has been utilized in the past has been an optical comparative system as used by the Gulf Atomic Company. A major disadvantage of that system is the high cost of the equipment.

A need exists to provide an accurate, in-line, automatic, remotely-operated inspection system of reduced cost. The present invention was conceived to meet this need in a manner to be described hereinbelow.

SUMMARY OF THE INVENTION

It is the object of the present invention to provide an inspection system for nuclear fuel rods or pellets that is adapted to be remotely-operated in an in-line, automatic manner to provide accurate read-out results during operation thereof.

The above object has been accomplished in the present invention by providing a diameter and surface inspection gage of cylindrical configuration for the inspection of cylindrical samples, which gage comprises an inspection ring having a cylindrical passageway for the movement therethrough of the samples for inspection thereof, a plurality of pnuematic jets coupled to a gas source and exiting into the gage passageway, the jets being connected into four circuits of an equal number of jets at different polar orientation to the axis of the passageway, a pressure transducer in each circuit, and a comparator connected to the transducers to monitor for imbalance in pressure which is indicative of any diameter variations or surface imperfections of the samples being inspected.

DESCRIPTION OF THE PREFERRED EMBODIMENT

Figure 1:
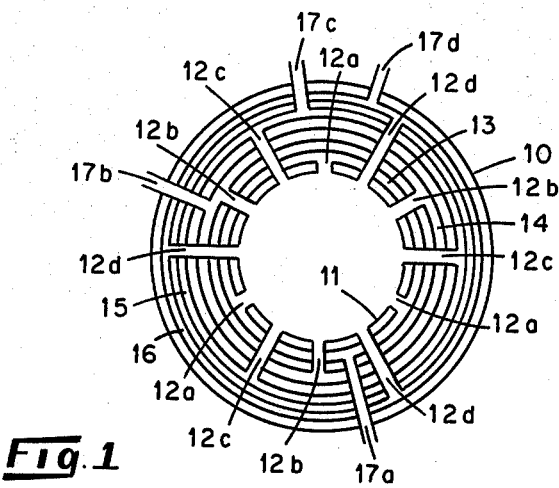
FIG. 1 is a schematic cross-sectional view of the inspection ring utilized in the system of the present invention.

With reference to FIG. 1, which is a schematic representation, the inspection ring of the present invention is an annular housing 10 provided with a cylindrical bore 11 of a size closely approximating, but larger than, the diameter of objects to be inspected thereby. Extending radially inwardly into the bore are a plurality of equally spaced pneumatic jets 12. Three jets 12a, positioned at 120° from each other, communicate with an annular header 13. Another three jets 12b, at 120° to each other and at different polar positions (30°) than jets 12a, communicate with an annular header 14. In a similar manner, two other sets of jets 12c and 12d communicate with respective annular headers 15, 16 whereby four pneumatic circuits are provided each having three jets. As shown, annular header 13 is supplied by line 17a; header 14, by line 17b; etc.

It would be preferred if all jets 12 were located in a common plane in the housing 10. If this were possible, for a 0.492 inch diameter bore and jet nozzles of 0.043 inch, a spacing of only 0.093 inch would exist between one jet and the adjacent jet in either direction. For simplicity of construction, however, each set of jets and its header may be set into a separate ring and the four layers joined in any suitable manner. Other "sandwich-type" structures are possible, e.g., two sets of jets may be installed in each of two rings, with appropriate passages leading to the respective headers.

Figure 2:
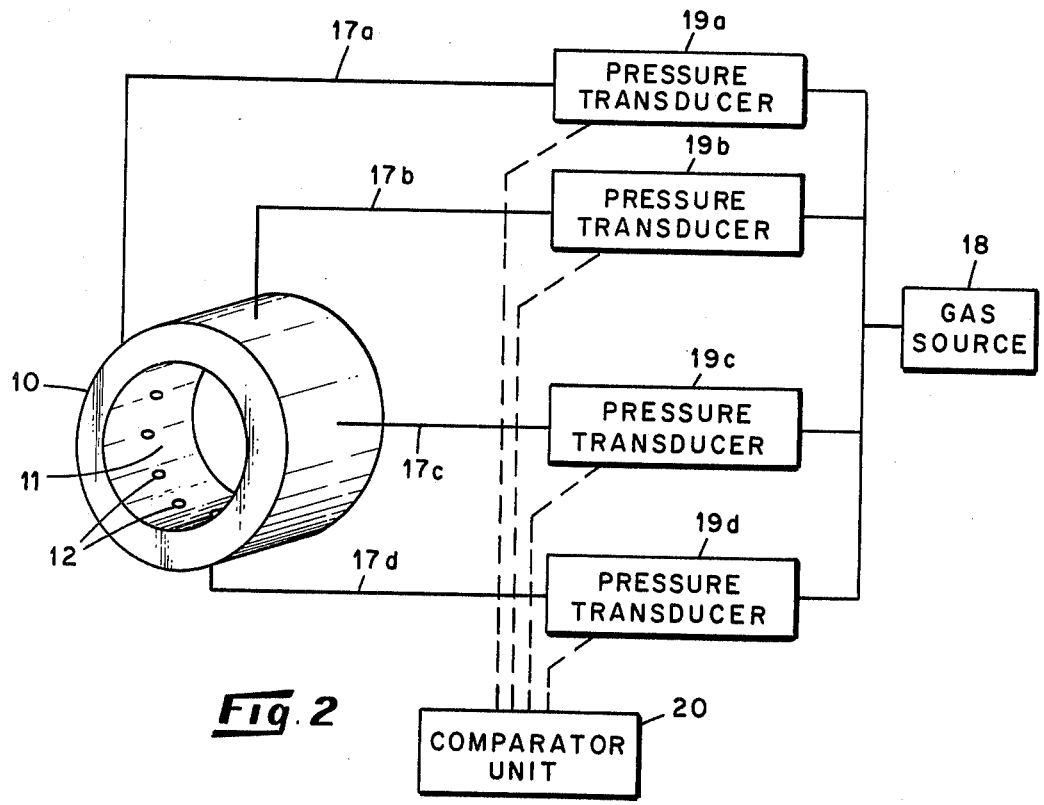
FIG. 2 is a schematic diagram of the inspection system of the present invention.

Now referring to FIG. 2, each of the pneumatic circuits in housing 10 are attached through the appropriate lines 17 (a, b, c, d) to a gas source 18. The gas may be air or, for specialized environments, an inert gas such as argon. Interposed in each line 17 is a pressure transducer 19 (a, b, c, d) whose outputs are fed to a comparator unit 20. The signals from transducers 19 are electronically processed by the comparator unit 20. As discussed hereinafter, a change of pressure in any circuit caused by a change in diameter or surface imperfection of an object being inspected will be promptly diagnosed whereby the object may be routed to a "reject" storage area. Also, if desired, some type of an alarm (not shown), such as a signal light, etc., may be initiated.

The operation of the instant inspection gage is based upon the well-known fluidic inspection principles but extended to inspect a substantially greater proportion of an object's surface. Using one of the pneumatic circuits as an example, a gas at a constant pressure is fed through three jets 12a located 120° apart in a ring formation within the gage. A certain back pressure (monitored by sensor 19a) will exist if an object is adjacent the jets, the value of the pressure being an average of the resistance to flow out of the three jets. When an object of constant diameter, without surface flaws, passes through the gage the back pressure in any circuit remains constant. Any change in spacing from a jet, however, changes this average back pressure value.

In a similar manner jets 12b, that are displaced a polar angle of 30° to jets 12a, produce an average back pressure as monitored by sensor 19b. The value of back pressure remains constant for an object of constant diameter and uniform surface. The jets in the other two circuits (12c, 12d) perform a like function but "look at" still other surfaces of an object. It may be seen, therefore, there are twelve paths along an object which are inspected. When the average back pressure of any circuit varies outside pre-set limits, this is an indication that the object under inspection has a diameter or surface variation exceeding a standard variation and should be discarded. The comparison of the outputs from sensors 19a, b, c, d is performed using the aforementioned comparator unit 20.

Figure 3:
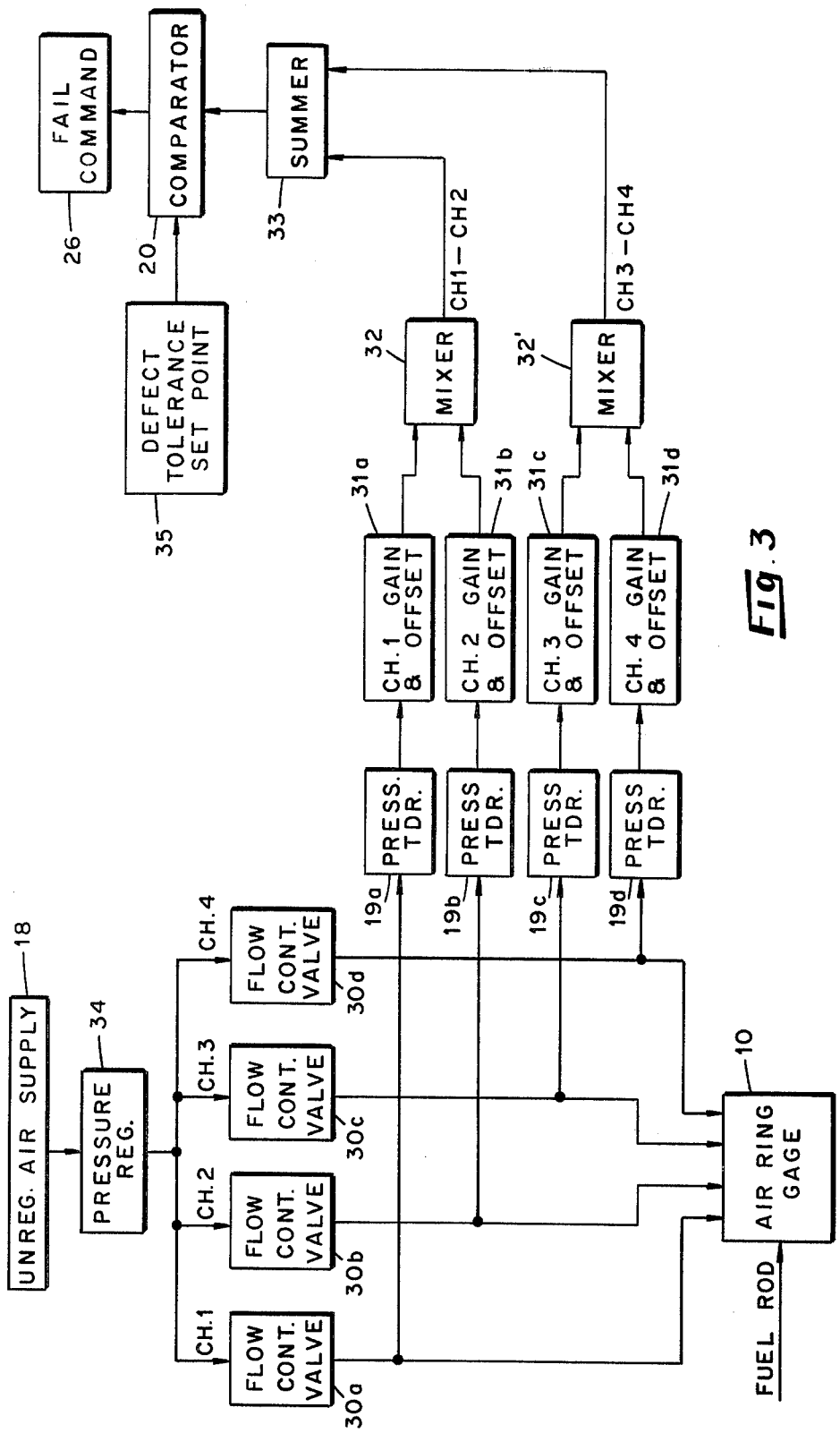
FIG. 3 is a schematic block diagram of the monitoring system showing in more detail the components of FIG. 2.
Figure 4:
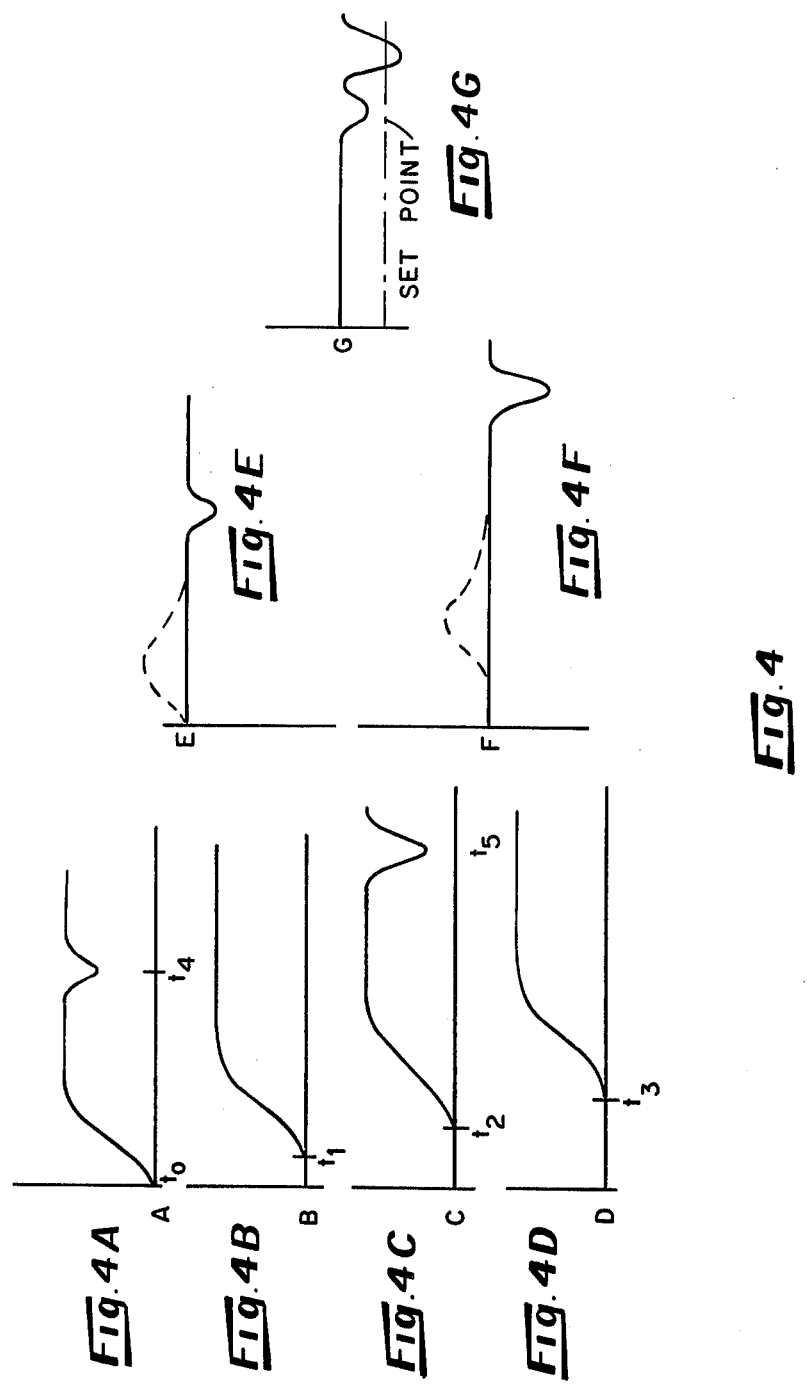
FIG. 4A–4G are plots of some typical electrical waveforms in the operation of the circuit of FIG. 3.

A more complete understanding of the monitoring system of FIG. 2 is possible by referring to the block diagram of FIG. 3. Air (or another suitable gas) is provided from source 18 to the gage 10 through a pressure regulator 34 and then through constant flow valves 30a, b, c, d. As above-stated, each pneumatic circuit contains a pressure transducer 19a, etc. The electrical output of each is provided to a typical amplifier and offset circuit 31a, etc. In each amplifier the gain may be set whereby each channel produces a signal equal to that of the other channels. In this manner the outputs of amplifiers 31a and 31b may be substracted in mixer 32 whereby no output from mixer 32 occurs unless a defect causes a change in output from either of the amplifiers. In a like manner, the outputs of amplifiers 31c and 31d are substracted in mixer 32'. The outputs of mixers 32 and 32' are fed to a summing amplifier 33 with the output, if any, being compared to a set point value in comparator 20. When the output of summer 33 exceeds the set point which is provided by the unit 35, a signal is sent to a rejection system (see FIG. 5, to be described hereinbelow).

The purpose of the intercomparison of channels through the substraction and addition is to eliminate, or substantially reduce, the effects of temperature changes, pressure regulator fluctuations, etc. Any of these changes will affect all channels equally.

The individual electrical signal waveforms shown in FIG. 4A–4G will illustrate this balancing effect. Waveforms A through D may be, typically, the electrical signal from transducers 19a, b, c, d, respectively, after amplification in units 31a, etc. The time, $t_o$, is that when a pellet first starts under jets 12a of the gage; time, $t_1$, is that when the pellet starts under jets 12b; and times $t_2$, $t_3$, are those for the pellet beginning under jets 12c and 12d, respectively. The dips at $t_4$ and $t_5$ represent a pressure drop due to surface flaws passing beneath jets 12a and 12c: if a change in diameter had occurred, all channels would have registered a pressure change. When waveforms A and B are substracted, a waveform like that of E will be produced. The region with the dashed line would occur if very fast response occurred in each channel: the wave form B lagging waveform A. This may be substantially reduced by any delay in the system so that only the signal caused by the defect will be noted. Similarly, waveform F is the difference between waveforms C and D. When waveforms E and F are added, in summer 33, the signal to the comparator 20 will be like waveform G. It may be seen that one small variation, as seen by channel a, does not initiate a reject signal. However, the larger second defect produces a signal greater than the set point and would cause the pellet to be rejected. It will be apparent that the signals from the four channels may be treated in other circuits to accomplish a go-no-go output signal. For example, the signals may be delayed until all have reached a steady state and then compared with each other whereby a deviation of any one of sufficient magnitude will provide a reject signal.

Figure 5:
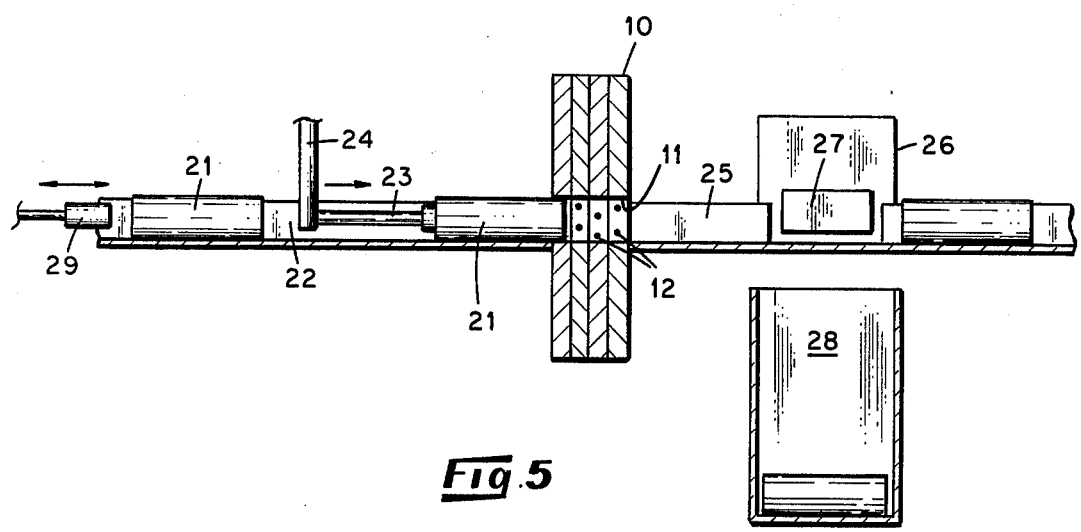
FIG. 5 is a schematic diagram of a system employing the inspection ring of FIG. 1

It should be understood that the surface inspection gage 10 is adapted to be installed in a fuel fabrication plant assembly line at any desired location. However, its location is preferably immediately downstream from a fuel rod or pellet forming machine or pellet sintering operation. Such a pellet handling system is schematically illustrated in FIG. 5. The pellets 21 are adapted to be moved sequentially from the pellet-forming or treating equipment by a pneumatic conveyor 22 and thence to the entrance of the gage 10 which is mounted with the axis of the bore thereof substantially horizontal.

Typically a push rod 23, mounted from an arm 24, then advances a single pellet 21 through the bore 11 of the gage 10 at a constant speed. The arm 24 and ram 23 are then adapted to be removed to permit the following pellet to be advanced by a plunger 29 and thereafter moved through the gage. This assures a constant and repeatable velocity of pellets through the gage. At the exit of the gage 10, a second conveyor 25 moves an inspected pellet past a rejection system. One typical system consists of a fail command operator 26 for a cross ram 27. The operator 26 receives output signals of a pressure imbalance from the aforementioned comparator 20 whereby ram 27 causes defective pellets to fall into receptacle 28. Acceptable pellets continue on conveyor 25 for their ultimate use.

The unit 10 was designed to operate at a selected pressure in the range of 15–40 psi, although this is not critical. Each pellet will pass through the gage unit 10 in about 1 sec. so that inspection will be very rapid. It should be apparent that the number and size of jets utilized in the gage unit 10 will govern the proportion of the exterior surface of the respective pellets that will be inspected. Thus, more or less than the four sets of three jets each may be used to assure a desired degree of inspection.

It has been determined that the above-described inspection system can achieve the desired sensitivity of 0.0001–0.0002 inch while maintaining a rapid response time. Also, the cost of the present system is substantially less than that of previous equipment used for the same type of inspection.

This invention has been described by way of illustration rather than by limitation, and it should be apparent that it is equally applicable in fields, and for objects of other size, other than those described herein.

What is claimed is:

1. A diameter and surface inspection gage system for sequentially inspecting a plurality of respective cylindrical objects, comprising an inspection ring provided with a cylindrical passageway; a plurality of respective sets of equally spaced, pneumatic jets exiting into said passageway, each of said sets of jets being oriented at different respective polar orientations to the axis of said passageway with respect to each of the other sets of jets; a plurality of pneumatic circuits with each of said sets of jets being connected by separate annular headers into a respective one of said pneumatic circuits; a source of constant pneumatic pressure coupled to said pneumatic circuits, a respective pressure transducer coupled to each of said pneumatic circuits; a pneumatic operated conveyor means including a rejection system and affixed to said inspection ring, said conveyor means adapted to sequentially move each of said cylindrical objects to be inspected through said passageway of said inspection ring; each of said respective pressure transducers adapted to sense the respective average back pressure from each of said respective pneumatic circuits and provide a respective electrical signal output as a function of said respective average back pressure; and an electronic comparator connected to the electrical outputs of said transducers, said comparator adapted to provide an electrical output signal as a function of any imbalance in back pressure as sensed by said transducers which is indicative of any diameter variations or surface imperfections of any given one of said objects being inspected.

2. The system set forth in claim 1, wherein said rejection system comprises a reject bin positioned below said conveyor means and beyond said inspection ring; a fail command operator provided with a cross ram; and means for connecting the output of said comparator to said fail command operator, said operator with its cross ram positioned beyond said inspection ring and adapted to cause an inspected, defective object to be pushed from said conveyor means and thus fall into said reject bin in response to a pressure imbalance signal from said comparator.

3. The system set forth in claim 2, wherein the number of said pneumatic circuits and associated transducers is four, and the number of jets in each of said sets is three, said system further including a respective amplifier gain and offset unit coupled to the output of each of said transducers; a first electronic mixer unit coupled to the outputs of two of said gain and offset units; a second electronic mixer unit coupled to the outputs of the other two of said gain and offset units; an electronic summer, the outputs of said first and second mixer unit coupled to said electronic summer, and the output of said summer coupled to said comparator.

* * * * *